United States Patent Office 2,884,370
Patented Apr. 28, 1959

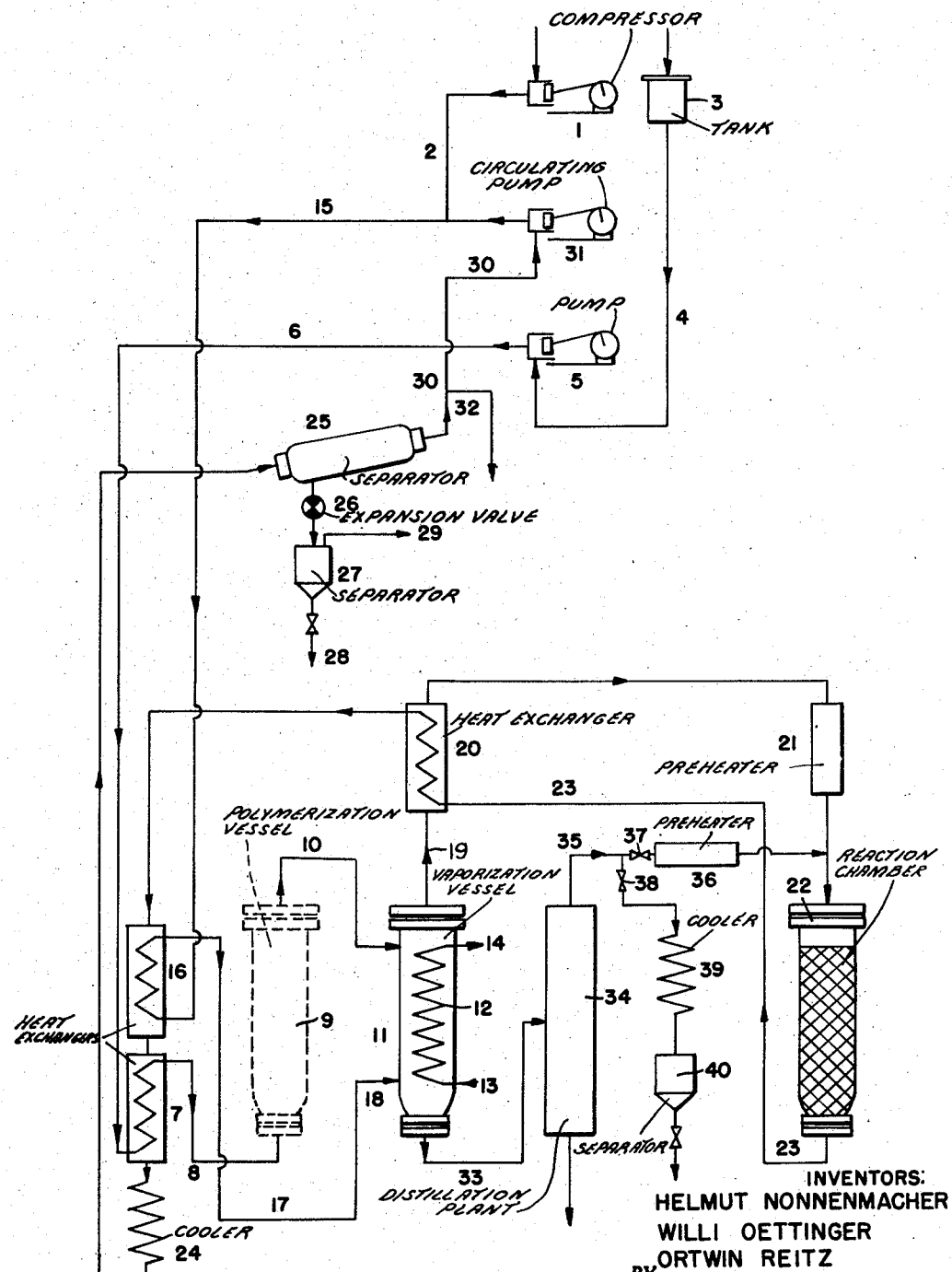

2,884,370

CATALYTIC PRESSURE REFINING OF HYDROCARBONS OF LOW BOILING POINT IN THE PRESENCE OF A MIXTURE OF CO AND HYDROGEN

Helmut Nonnenmacher and Willi Oettinger, Ludwigshafen (Rhine), and Ortwin Reitz, Heidelberg, Germany, assignors to Badische Anilin- & Soda-Fabrik Aktiengesellschaft, Ludwigshafen (Rhine), Germany Application January 24, 1955, Serial No. 483,792

Claims priority, application Germany February 2, 1954

14 Claims. (Cl. 208—97)

This invention relates to a new and improved catalytic method of pressure refining of hydrocarbons of low boiling point.

It is known that low boiling point hydrocarbons, such as crude benzene, crude gasoline, crude kerosene and crude gas oil can be freed from sulfur, oxygen and if desired nitrogen compounds without changing the boiling range of the product by treatment with hydrogen under a pressure of 10 atmospheres or more, as for example 10 to 150 atmospheres, at temperatures above 200° C., preferably between 300° C. and 420° C., in the presence of catalysts.

We have now found that when using hydrogen containing carbon monoxide, a specially high refining action is obtained by ascertaining by preliminary test the conditions of throughput, temperature and hydrogen partial pressure at which such an amount of carbon monoxide and hydrogen react that a rise in temperature of at least 10° C. and at the most 50° C. takes place in the reaction chamber and then carrying out the refining under these ascertained conditions.

As hydrogen containing carbon monoxide there are used gases which contain from 4 to 20%, in particular 5 to 15%, of carbon monoxide, as for example coke oven gas, illuminating gas, watergas or other industrial gases.

Sometimes it is advantageous to purify these gases before they are used, for example to free them from unsaturated compounds and nitrogen oxides.

The reaction is carried out with a gas amount of 0.2 to 2.5, in particular 0.5 to 1.8, cubic metres per kilogram of raw material, within a hydrogen partial pressure of 10 to 60, in particular 10 to 50, atmospheres, a throughput of 0.3 to 2.5 kilograms, in particular 0.4 to 2 kilograms of crude material per litre of catalyst space per hour and an initial temperature of 280° to 350° C. in particular 300° to 340° C. ,in the reaction chamber while using active hydrogenation catalysts. Outside these limits there is no reaction of the carbon monoxide with the hydrogen or an undesirably high reaction, and in both cases a bad refining action takes place. Within the said limits of hydrogen partial pressure, temperature and throughput, the conditions should be so adjusted that the following equation is satisfied:

$$\frac{p_{H_2}-10}{60-10}+\frac{t-x}{y-x}-\frac{D-0.3}{2.5-0.3}=0 \text{ to } 1$$

in particular 0.2 to 0.8 in which $p_{H_2}$ represents the hydrogen partial pressure, $t$ the temperature, $x$ the lower limit of the said temperature range of 280° to 350° C., $y$ the upper limit of this temperature range and $D$ the throughput in kilograms of raw material per litre of catalyst space per hour. The formula will be explained by reference to examples within the hydrogen partial pressure range of 10 to 30 atmospheres. When using active hydrogenation catalysts this range of 10 to 30 atmospheres is especially preferred. When using a hydrogen partial pressure of 15 atmospheres, there is selected for example an admission temperature of 320° C. and a throughput of 1 kilogram, or an admission temperature of 340° C. and a throughput of 1.5 kilograms, or an admission temperature of 350° C. and a throughput of 2 kilograms. According to the above formula, the value then lies between 0.3 and 0.4. At a hydrogen partial pressure of 30 atmospheres, an admission temperature of 300° C. is used with a throughput of 1 kilogram, an admission temperature of 310° C. with a throughput of 1.5 kilograms and an admission temperature of 330° C. with a throughput of 2 kilograms. According to the formula, the value lies between 0.25 and 0.4. Under these conditions the desired reaction of carbon monoxide and hydrogen and a good refining action are obtained.

These values hold good for the use of active hydrogenation catalysts. These are the compounds, in particular the oxides, sulfides and silicates, of metals of the 5th, 6th and 8th groups of the periodic system, such as vanadium, molybdenum, tungsten, uranium, chromium, iron, nickel, cobalt, platinum, palladium and ruthenium. The halides, chromates, phosphates, borates, carbonates or salts of organic acids may also be used. Mixtures of these metal compounds, in particular the compounds of at least one metal of the 5th and 6th groups with a compound of at least one metal of the 8th group, as for example the iron group, are also suitable. The catalysts may also be applied to synthetically-prepared active carriers, as for example activated alumina or synthetically-prepared silicates, as for example silicates of aluminum, magnesium, zinc, zirconium and those of the rare earths. However, the silicates are not to be restricted to these elements, for other suitable silicates are those of the metals of the 6th to 8th groups of the periodic system, these latter silicates being provided with the oxides or sulfides of the metals of the 5th, 6th or 8th group of the periodic system. The term active alumina is mean to denote an alumina prepared by precipitation from an aluminum salt solution or an alumina solution. The precipitate is peptized to advantage with a small quantity of an acid or an acid salt solution. The precipitation of the aluminum salt solution is preferably carried out at a temperature of between 70° and 100° C. at a pH of between 7 and 11. Finally the precipitate is calcined. With these catalysts, an admission temperature of the temperature range of 280° to 350° C. is chosen. With catalysts of medium activity, such as the compounds, especially the oxides, sulfides or silicates, of the metals of the 5th, 6th and 8th group of the periodic system or mixtures of these on natural carriers, such as bauxite, bleaching earths or pumice, a temperature between 330° and 420° C. is used. In this case $x$ in the formula is equal to 330° C. and $y$ to 420° C. Sometimes less active catalysts may be used. As such there come into question the compounds of the metals of the 1st to 4th and 7th groups of the periodic system, as for example the oxides of copper, silver, gold, magnesium, zinc, cadmium, aluminum, titanium, beryllium, zirconium and manganese or mixtures of the same. With these, the admission temperature is chosen between 350° C. and 450° C. In the above formula $x$ is then equal to 350° C. and $y$ to 450° C.

When using the said hydrogen containing carbon monoxide, the hydrogen partial pressure falls during the course of the refining hydrogenation by enrichment of impurities. For this reason a considerable amount of the hydrogenation gas must be withdrawn from circulation. The process is rendered more expensive by the continual withdrawal of these amounts of gas, in particular by the compression costs.

To avoid this drawback the said gases are washed before use with the initial material to be refined under pressure, the initial material separated under pressure from the gases, the initial material freed from dissolved gases by release of pressure and the initial material then refined with the purified gases.

In this way carbon dioxide, unsaturated compounds and part of the hydrocarbons are removed from the hydrogenation gas. The washing of the gas is carried out under pressure, for example at 5 to 200 atmospheres, preferably under about the pressure at which the refining is carried out or slightly above the same and at room temperature, lower temperature or in some cases at slightly raised temperatures. It is preferable to use for the purpose a washing apparatus which is provided with filler bodies, such as Raschig rings. The washing is preferably carried out in countercurrent. After the washing under pressure, the liquid and gas are separated from each other in a separator and then the liquid is released from pressure and the gas formed is separated.

The advantage of this method of working may be explained for example in the case of the use of a town gas containing 53.7% of hydrogen, 2% of carbon dioxide, 3.6% of olefines, 0.8% of oxygen, 6.5% of carbon monoxide, 24% of hydrocarbons and 9.4% of nitrogen. This gas is washed in countercurrent with 2 metric tons of crude benzene under a pressure of 50 atmospheres at room temperature in a washing vessel filled with Raschig rings. The crude benzene is then released from pressure. 1 metric ton of this crude benzene is returned together with 1 metric ton of fresh product to the washing cycle, while the other metric ton, after compression to 50 atmospheres, is refined by the process described above. The reaction product is condensed and separated in a separator from gas which is returned to the circulation. From the circulation, 200 cubic metres of gas are released from pressure and supplied to the town gas network.

If on the other hand the town gas is not previously washed, 500 cubic metres of fresh gas must be compressed and 370 cubic metres released from pressure from the cycle in order to attain the same refining effect with otherwise similar conditions in the same unit of time.

The hydrogen-containing gas arising from the refining is usually returned in circulation. If it is desired to reduce still further impurities enriching themselves in the circulating gas, as for example methane or nitrogen, a part of the liquid refining product which has been wholly or partly freed from the excess pressure may be brought again to the working pressure and introduced into the pipe between the reaction vessel and the separator in which the separation of the liquid fraction from the gases takes place. It is preferable to bring the liquid refining product into contact with the gases and vaporous refining products in front of the cooler, as for example between the heat-exchanger and the cooler. By release of the pressure, the impurities washed out from the gas are freed from the liquid refining product. It is preferable to return at least half of the liquid product obtained per unit of time. In some cases it is only necessary to wash the hydrogen-containing gas led in circulation, without washing the refining gas.

The rising temperature in the reaction zone has a favorable effect on the refining of the low boiling point hydrocarbons. The refining action is better than in the hitherto conventional carrying out of the refining without increase in temperature in the reaction zone. Moreover higher throughputs can be used and the catalyst has a longer life.

A further advantage of this method of working resides in the fact that it is only necessary to heat the initial materials to relatively low temperatures, as for example 150° to 220° C., and this is possible by simple means. The heated initial materials and gases are brought at least nearly to the temperature desired at the entry into the reaction zone by indirect heat-exchange with the products leaving the reaction chamber. If the desired temperature is not quite attained, the residual heat can be supplied with the aid of an electrical preheater. The most preferred procedure consists in the hot reaction products leaving the reaction chamber heating up the preheated mixture consisting of initial materials and gases, in one or more heat exchangers at least nearly to the admission temperature into the reaction zone. The reaction products then give up further heat to the cold initial materials and gases. It is advantageous to heat up the two components separately. For this purpose there are used two heat exchangers in which the initial materials on the one hand and the gases on the other hand are heated up to temperatures of 150° to 220° C. A small amount of the gas may also be added to the initial materials. During the heating up the initial material and gas are led into a vaporization vessel, the effluent gases and vapors then being heated up with the hot reaction products coming directly from the reaction zone to the desired admission temperature into the reaction zone or nearly to this temperature. The liquid products are withdrawn from the bottom of the vaporizing vessel. These can be subjected to a refining hydrogenation or cracking in a separate reaction chamber. Preferably they are distilled. The distillate is supplied to the reaction zone and the small residue withdrawn from the process.

Between the preheating of the initial material to about 180° to 250° C. and the vaporization vessel there may be arranged a polymerization vessel in which the crude material remains for 10 to 60 minutes and polymers form. The use of such a vessel is especially suitable for crude benzene and crude gasoline when the readily polymerisable substances have not been removed by distillation before working up the raw materials. It is advantageous to carry out an intermediate heating between the preheater and the heater. For this purpose a steam coil may be inserted for example in the vaporizing vessel or the polymerization vessel. The heating up can also be carried out in an intermediate pipe so that a far-reaching evaporation takes place in the vaporizing vessel.

In some cases it has been found to be preferable to supply additional carbon monoxide to the reaction zone in order to set up the desired rise of temperature in the furnace. Instead of carbon monoxide there may also be used other substances which react exothermically with hydrogen, advantageously those which react with hydrogen at a lower temperature than carbon monoxide, as for example oxygen in small amounts. In this way it is possible to keep the admission temperature of the initial materials into the reaction zone very low and to carry out the refining under optimum conditions with a rise in temperature of 20° to 50° C., or even somewhat more.

It is advantageous to use the catalyst in a grain size of less than 6 millimetres, as for example 2 to 4 millimetres. The catalyst is arranged in a shaft in a shaft furnace, if desired in superposed layers.

The following examples will further illustrate this invention but the invention is not restricted to these examples. The examples are given with reference to the accompanying drawings.

*Example 1*

Coke oven gas containing 54% of hydrogen and 5.6% of carbon monoxide is compressed to 50 atmospheres total pressure in a gas compressor 1 and supplied by pipe 2 to the gas cycle. Crude benzene passes from a tank 3 through a pipe 4 and is brought to a pressure of 50 atmospheres by a pump 5. The crude benzene is supplied through a pipe 6 to a heat exchanger 7 where it is heated to a temperature of 170° C. It then passes through a pipe 8 into a polymerization vessel 9. The residence time in this vessel is 20 minutes. The crude benzene then passes through a pipe 10 at a temperature of 165° C. into the upper part of a vaporization vessel 11. In this vessel there is situated a steam coil 12 through which superheated steam is passed. This enters at 13 and leaves the coil at 14. The circulating gas is introduced into the lower half of the vessel 11. It passes through a pipe 15 into a heat exchanger 16 in which it is heated to 200° C., and then through pipe 17 into the vessel 11 at 18. In this vessel 95% of the crude benzene vaporizes. The vapor and gas leave the vaporizer column 11 through a pipe 19 and are heated up to 350° C. in a heat exchanger 20. If this temperature is not reached, the vapor and gas can be heated up to 350° C. in a small electrically-heated tube preheater 21. The reaction chamber 22 is filled with a pieced catalyst consisting of activated alumina provided with 10% of molybdic acid. The vapor and gas pass through the catalyst downwardly. The throughput of crude benzene amounts to 1.5 kilograms per litre of catalyst per hour, the amount of gas is 1.8 cubic metres per kilogram of crude benzene and the hydrogen partial pressure is 18 atmospheres. By the exothermic reaction of the conversion of part of the carbon monoxide with hydrogen, the temperature rises to 380° C. at the outlet of the reaction product and gas from the reaction vessel. The vaporous reaction product and gas leave the reaction vessel through a pipe 23, pass through the heat exchangers 20, 16 and 17 and the cooler 24 and pass into a separator 25. The refined liquid is released from pressure at 26 and passes into a second separator 27 which it leaves at the lower end at 28. The gas set free by releasing the pressure escaped through a pipe 29. From the separator 25, the gas is conveyed through a pipe 30 by the circulating pump 31 into the pipe 15 in which fresh gas and reflux gas are supplied to the reaction vessel. Part of the circulating gas is removed at 32 from the pipe 30 so that during the process a hydrogen partial pressure of 18 atmospheres is maintained.

At the lower part of the vessel 11 there is withdrawn through a pipe 33 a residue amounting to 5% of the crude benzene. The residue is supplied to a distillation plant 34. The vapor escaping through a pipe 35 is heated in an electrically-heated preheater 36 to 350° C. and supplied to the reaction vessel 22. By closing a valve 37 and opening a valve 38, the vapor can be conveyed through a cooler 39 into a separator 40. The condensed product is then supplied to the crude benzene in the tank 3.

From the distillation plant 34 there is withdrawn a residue amount to less than 0.5% with reference to the crude benzene.

A benzene practically free from sulfur is obtained in a yield of 99%.

*Example 2*

Crude kerosene containing 0.4% of sulfur is led in the vapor phase together with a purified town gas containing 52% of hydrogen and 6.5% of carbon monoxide over a catalyst consisting of activated alumina provided with 10% of a mixture of molybdenum sulfide and cobalt sulfide in a molecular ratio of 3:1. In order to obtain a rise in temperature in the reaction vessel by the reaction of part of the carbon monoxide, preliminary tests are carried out at a total pressure of 60 atmospheres and throughputs between 1 and 1.5 kilograms of raw material per litre of catalyst volume per hour. It is found in this way that a good refining effect is obtained with a throughput of 1.2 kilograms of raw material per litre of catalyst volume per hour, with a gas amount of 1.5 cubic metres per kilogram of raw material at a hydrogen partial pressure of 25 atmospheres and an admission temperature of the raw material into the reaction vessel of 335° C. The exit temperature of the reaction product is 360° C. By the continual supply of fresh town gas and releasing the pressure on part of the circulating gas, the hydrogen partial pressure is kept constant at 25 atmospheres.

The initial material and the town gas are heated to about 150° to 200° C. either together or separately in one or two heat exchangers in countercurrent to the reaction products. The products thus preheated are then heated by the substances directly as they leave the reaction chamber in a first heat exchanger. The heat lacking is supplied in a small electrical preheater.

A kerosene with a sulfur content of 0.01% is obtained in a yield of 99%.

*Example 3*

A low temperature carbonisation gasoline from mineral oil, which boils at 45° to 190° C., contains 1.5% of phenols and 0.25% of sulfur and has a bromine number of 90 is led in the vapor phase with a coke oven gas containing 50% of hydrogen and 10% of carbon monoxide over a catalyst consisting of tungsten sulfide and nickel sulfide in a molecular ratio of 2:1. Preliminary tests are carried out at a total pressure of 40 atmospheres and a hydrogen partial pressure of 15 atmospheres. It is found that a good refining effect is obtained at a throughput of 0.8 kilogram of raw material per litre of catalyst volume per hour and an admission temperature of the raw material into the reaction chamber of 310° C. and a rise in temperature in the reaction chamber of 30° C. An amount of gas of 1.2 cubic metres per kilogram of raw material is used. Under these conditions the reaction can be carried on continuously.

The raw material to be refined and the coke oven gas can be heated up to the necessary admission temperature into the reaction chamber by the gases and vapors withdrawn from the reaction chamber which have an exit temperature of 340° C. A small electrical preheater is required merely for initiation.

There is obtained in a yield of 97.5% a gasoline practically free from phenol and sulfur which gives an evaporation residue at 165° C. of 1 mg. per 100 ccs.

We claim:

1. An improved process for the removal of such impurities as sulfur, oxygen and nitrogen compounds by the catalytic pressure refining of low boiling point hydrocarbons as initial material selected from the group consisting of crude benzenes, crude gasolines, crude kerosenes and crude gas oils with hydrogen containing carbon monoxide, such that the product of said refining has substantially the same boiling range as the initial material, which comprises carrying out the refining with 0.2 to 2.5 cubic metres per kilogram of initial material of a hydrogen containing carbon monoxide gas having a carbon monoxide content of from 4 to 20% at a hydrogen partial pressure of 10 to 60 atmospheres, a throughput of 0.3 to 2.5 kilograms of crude material per litre of catalyst volume per hour and an admission temperature into the reaction zone of 280° C. to 450° C. in such manner that during the refining such an amount of carbon monoxide reacts with hydrogen that a rise in temperature of at least 10° C. and at most 50° C. takes place in the reaction zone.

2. A process as claimed in claim 1 wherein the refining is carried out at a hydrogen partial pressure of 10 to 50 atmospheres.

3. A process as claimed in claim 1 wherein the refining is carried out at a throughput of 0.4 to 2 kilograms of crude material per litre of catalyst volume per hour.

4. A process as claimed in claim 1 wherein the admission temperature into the reaction zone is chosen between 280° and 350° C. and there is used as catalyst at least one metal compound from the group consisting of compounds of the metals of the 5th, 6th and 8th groups of the periodic systems and compounds of the metals of the 5th, 6th and 8th groups of the periodic system applied on activated synthetically-prepared carriers.

5. A process as claimed in claim 1 wherein the admission temperature into the reaction zone chosen is between 330° and 420° C. and there is used as a catalyst at least one metal compound selected from the group consisting of the compounds of the metals of the 5th, 6th and 8th groups of the periodic system applied to natural carriers.

6. A process as claimed in claim 1 wherein an admission temperature into the reaction zone chosen is between 350° and 450° C. and there is used as catalyst at least one metal compound from the group consisting of compounds of metals of the 1st to 4th and 7th groups of the periodic system.

7. An improved process for the removal of such impurities as sulfur, oxygen and nitrogen compounds by the catalytic pressure refining of low boiling point hydrocarbons as initial material selected from the group consisting of crude benzenes, crude gasolines, crude kerosenes and crude gas oils with hydrogen containing carbon monoxide, such that the product of said refining has substantially the same boiling range as the initial material, which comprises carrying out the refining with 0.2 to 2.5 cubic metres per kilogram of initial material of a hydrogen containing carbon monoxide gas having a carbon monoxide content of from 4 to 20% in the presence of at least one catalytically-acting metal compound from the group consisting of compounds of the metals of the 5th, 6th and 8th groups of the periodic system and compounds of the metals of the 5th, 6th and 8th groups of the periodic system applied to activated synthetically-prepared carriers, at a hydrogen partial pressure of 10 to 60 atmospheres, a throughput of 0.3 to 2.5 kilograms of crude material per litre of catalyst volume per hour and at an admission temperature into the reaction zone of 280° to 350° C. in such a manner that the formula $$\frac{p_{H_2}-10}{50}+\frac{t-280°}{70}-\frac{D-0.3}{2.2}$$

(in which $p_{H_2}$ is the hydrogen partial pressure used, $t$ is the admission temperature used and D is the throughput used) gives a value between 0 and 1.

8. An improved process for the removal of such impurities as sulfur, oxygen and nitrogen compounds by the catalytic pressure refining of low boiling point hydrocarbons as initial material selected from the group consisting of crude benzenes, crude gasolines, crude kerosenes and crude gas oils with hydrogen containing carbon monoxide, such that the product of said refining has substantially the same boiling range as the initial material, which comprises carrying out the refining with 0.2 to 2.5 cubic metres per kilogram of initial material of a hydrogen containing carbon monoxide gas having a carbon monoxide content of from 4 to 20% in the presence of at least one catalytically-active metal compound from the group consisting of the compounds of metals of the 5th, 6th and 8th groups of the periodic system applied on natural carriers, at a hydrogen partial pressure of 10 to 60 atmospheres, a throughput of 0.3 to 2.5 kilograms of crude material per litre of catalyst volume per hour and at an admission temperature into the reaction chamber of 330° to 420° C. in such a manner that according to the formula $$\frac{p_{H_2}-10}{50}+\frac{t-330°}{90}-\frac{D-0.3}{2.2}$$

(in which $p_{H_2}$ is the hydrogen partial pressure used, $t$ is the admission temperature used and D is the throughput used) a value between 0 and 1 is obtained.

9. An improved process for the removal of such impurities as sulfur, oxygen and nitrogen compounds by the catalytic pressure refining of low boiling point hydrocarbons as initial material selected from the group consisting of crude benzenes, crude gasolines, crude kerosenes and crude gas oils with hydrogen containing carbon monoxide, such that the product of said refining has substantially the same boiling range as the initial material, which comprises carrying out the refining with 0.2 to 2.5 cubic metres per kilogram of initial material of a hydrogen containing carbon monoxide gas having a carbon monoxide content of from 4 to 20% in the presence of at least one catalytically-active metal compound from the group consisting of the compounds of metals of the 1st to the 4th and the 7th groups of the periodic system, at a hydrogen partial pressure of 10 to 60 atmospheres a throughput of 0.3 to 2.5 kilograms of crude material per litre of catalyst volume per hour and at an admission temperature into the reaction chamber of 350° to 450° C. in such manner that according to the formula $$\frac{p_{H_2}-10}{50}+\frac{t-350°}{100}-\frac{D-0.3}{2.2}$$

(in which $p_{H_2}$ is the hydrogen partial pressure used, $t$ is the admission temperature used and D is the throughput used) a value between 0 and 1 is obtained.

10. An improved process for the removal of such impurities as sulfur, oxygen and nitrogen compounds by the catalytic pressure refining of low boiling point hydrocarbons as initial material selected from the group consisting of crude benzenes, crude gasolines, crude kerosenes and crude gas oils with hydrogen containing carbon monoxide, such that the product of said refining has substantially the same boiling range as the initial material, which comprises carrying out the refining with 0.2 to 2.5 cubic metres per kilogram of initial material of a hydrogen containing carbon monoxide gas having a carbon monoxide content of from 4 to 20% at a hydrogen partial pressure of 10 to 60 atmospheres, a throughput of 0.3 to 2.5 kilograms of crude material per litre of catalyst volume per hour and an admission temperature into the reaction zone of 280° to 450° C. in such manner that during the refining such an amount of carbon monoxide reacts with hydrogen that a rise in temperature of at least 10° C. and at the most 50° C. takes place in the reaction zone, and conducting the reaction products leaving the reaction zone to heat preheated initial materials and gases at least to near the temperature desired upon entry into the reaction zone by indirect heat-exchange.

11. A process as claimed in claim 10 wherein the reaction products leaving the reaction zone first heat a preheated mixture consisting of initial material and gas by indirect heat-exchange at least nearly to the admission temperature into the reaction zone, and then separately preheat the initial material on the one hand and at least the bulk of the gas on the other hand by indirect heat-exchange.

12. A process as claimed in claim 11 wherein the preheated initial material and gas are led into a vaporization vessel, vapors are withdrawn and heated by the hot reaction products leaving the reaction zone by indirect heat-exchange at least nearly to the admission temperature into the reaction zone, and a liquid fraction is withdrawn at the lower end of the vaporization vessel.

13. A process as claimed in claim 12 wherein the preheated initial material and gas are led first into a polymerization vessel and then into a vaporization vessel, additional heat is supplied from an external source to at least one of said vessels the vapors from the vaporization vessel are heated by the hot reaction products leaving the reaction zone by indirect heat-exchange at least nearly to the admission temperature into the reaction zone, and a liquid fraction is withdrawn at the lower end of the vaporization vessel.

14. A process as claimed in claim 12 wherein the liquid fraction from the vaporization vessel is distilled and the distillate supplied to the reaction zone.

References Cited in the file of this patent

UNITED STATES PATENTS

| | | |
|---|---|---|
| 1,257,829 | Evans | Feb. 26, 1918 |
| 2,393,288 | Byrns | Jan. 22, 1946 |
| 2,440,673 | Jones | May 4, 1948 |
| 2,567,252 | Strang | Sept. 11, 1951 |
| 2,614,066 | Cornell | Oct. 14, 1952 |
| 2,623,006 | McAfee | Dec. 23, 1952 |
| 2,642,381 | Dickinson | June 16, 1953 |
| 2,671,754 | De Rosset et al. | Mar. 9, 1954 |
| 2,694,671 | Baumgarten et al. | Nov. 16, 1954 |